United States Patent [19]

Awasaka et al.

[11] Patent Number: 5,304,100
[45] Date of Patent: Apr. 19, 1994

[54] AUTOMATIC TENSIONER APPARATUS

[75] Inventors: Moriyoshi Awasaka; Yoshio Kadoshima, both of Saitama, Japan

[73] Assignee: Honda Giken Kogyo Kabushiki Kaisha, Tokyo, Japan

[21] Appl. No.: 872,091

[22] Filed: Apr. 22, 1992

[30] Foreign Application Priority Data

Apr. 25, 1991 [JP] Japan ................... 3-095571

[51] Int. Cl.$^5$ ............................................. F16H 7/12
[52] U.S. Cl. ..................................... 474/135; 474/139
[58] Field of Search ............................... 474/133–135, 474/139

[56] References Cited

U.S. PATENT DOCUMENTS

| | | | |
|---|---|---|---|
| 4,500,303 | 2/1985 | Sermersheim et al. | 474/135 X |
| 4,525,151 | 6/1985 | Tomita et al. | 474/134 X |
| 4,543,079 | 9/1985 | Matsuda et al. | 474/111 |
| 4,557,709 | 12/1985 | St. John | 474/135 X |
| 4,761,155 | 8/1988 | Kinoshita et al. | 474/133 X |
| 4,798,564 | 1/1989 | Benedict | 474/135 X |
| 4,822,321 | 4/1989 | Webb | 474/135 X |

*Primary Examiner*—Ramon S. Britts
*Assistant Examiner*—Roger J. Schoeppel
*Attorney, Agent, or Firm*—Lyon & Lyon

[57] ABSTRACT

An automatic tensioner apparatus comprising an idler pulley engaging a transmission belt of a wrapping connector type transmission mechanism, an arm for swingably supporting the idler pulley with respect to a predetermined supporting surface, and a resilient member for exhibiting a resilient force for swinging the arm and the idler pulley in a direction to engage the transmission belt in order to apply a predetermined tension to the transmission belt. A casing for accommodating the resilient member is secured to the supporting surface and an arm pivot-supporting portion for swingably supporting a base portion of the arm is integrally provided on the casing in such a manner that the arm pivot-supporting portion is offset relative to the resilient member in a direction along the supporting surface and relative to the resilient member in a direction away from the supporting surface. The automatic tensioner apparatus need not be separated especially forwardly from the supporting surface to locate the so-called belt line at a front, distanced position from the supporting surface for ensuring a relatively wide space to place another functional part around the automatic tensioner apparatus between the base portion of the arm and the supporting surface. The space is obtained without difficulty.

16 Claims, 6 Drawing Sheets

AUTOMATIC TENSIONER APPARATUS

BACKGROUND OF THE INVENTION

1. Field of the Invention

The present invention relates to an automatic tensioner apparatus for applying a tensioning force to a transmission belt or the like of a wrapping connector type transmission mechanism, such as commonly used on automotive engines.

2. Description of the Prior Art

There is a conventionally known automatic tensioner apparatus comprising an idler pulley engaging a transmission belt of the wrapping connector type transmission mechanism, an arm for swingably supporting the pulley on a supporting surface, and a resilient member for exhibiting a resilient force for swinging the arm and idler pulley in a direction to engage the transmission belt.

Such an automatic tensioner apparatus can be used for various applications and, for example, is utilized on an internal combustion engine of an automobile. FIG. 6 is a sectional elevation that illustrates one example of such a conventional automatic tensioner apparatus for use on an internal combustion engine, in which a support shaft 100 is fixed onto a base plate 015 that is fixed to a supporting surface f of an engine block E of the internal combustion engine, and the base portion of an arm 011 is swingably carried on the support shaft 100. An idler pulley 010 is rotatably carried on a tip end of the arm 011 to engage a transmission belt Bs. A resilient member 012 in the form of a coiled spring is disposed between the base portion of the arm 011 and the base plate 015 for biasing the idler pulley 010 at the tip end of the arm 011 in a direction to engage the transmission tension belt Bs. However, behind the base portion of the arm 011, there is not sufficient space to place other functional parts around the automatic tensioner apparatus. Therefore, if the other functional parts, e.g., a transmission belt Bt of another wrapping connector type transmission mechanism is intended to be placed behind the base portion of the arm 011, it is necessary to provide special components to separate the entire automatic tensioner apparatus, including the base plate 015, from the supporting surface f, and to extend the so-called belt line of the transmission belt Bs forwardly, resulting in a problem of increasing the size of the entire apparatus and perhaps the overall length of the engine.

SUMMARY OF THE INVENTION

Accordingly, it is an object of the present invention to provide an automatic tensioner apparatus wherein even if the belt line is not projected for forwardly from the supporting surface, sufficient space to place other functional parts between the base portion of the arm and the supporting surface can be ensured, thereby overcoming the problem associated with the above-described prior art apparatus.

To achieve the above object, according to the present invention, there is provided an automatic tensioner apparatus comprising an idler pulley engaging a transmission belt of a wrapping connector type transmission mechanism, an arm for swingably supporting the idler pulley with respect to a predetermined supporting surface, and a resilient member for producing a resilient force for swinging the arm and thereby the idler pulley in a direction to engage the transmission belt in order to apply a predetermined tension to the transmission belt, wherein the system further includes a casing secured to the supporting surface for accommodating the resilient member and an arm pivot-supporting portion for swingably supporting a base portion of the arm, the pivot-supporting portion being integrally provided on the casing in such a manner that the arm pivot-supporting portion is offset relative to the resilient member in a direction along the supporting surface and relative to the resilient member in a direction away from the supporting surface.

With the above feature of the present invention, even if the automatic tensioner apparatus is not especially separated in a forward direction from the supporting surface in order to locate the so-called belt line of the transmission belt forwardly, a relatively large space for placing other functional parts around the automatic tensioner apparatus between the base portion of the arm and the supporting surface can be ensured without difficulty, which contributes to a reduction in size of the entire apparatus.

The above and other objects, features, and advantages of the invention will become apparent from a consideration of the following description of the preferred embodiments, taken in conjunction with the accompanying drawings.

BRIEF DESCRIPTION OF THE DRAWINGS

The drawings illustrate a preferred embodiment of the present invention, wherein.

DESCRIPTION OF THE PREFERRED EMBODIMENT

Figure 1:
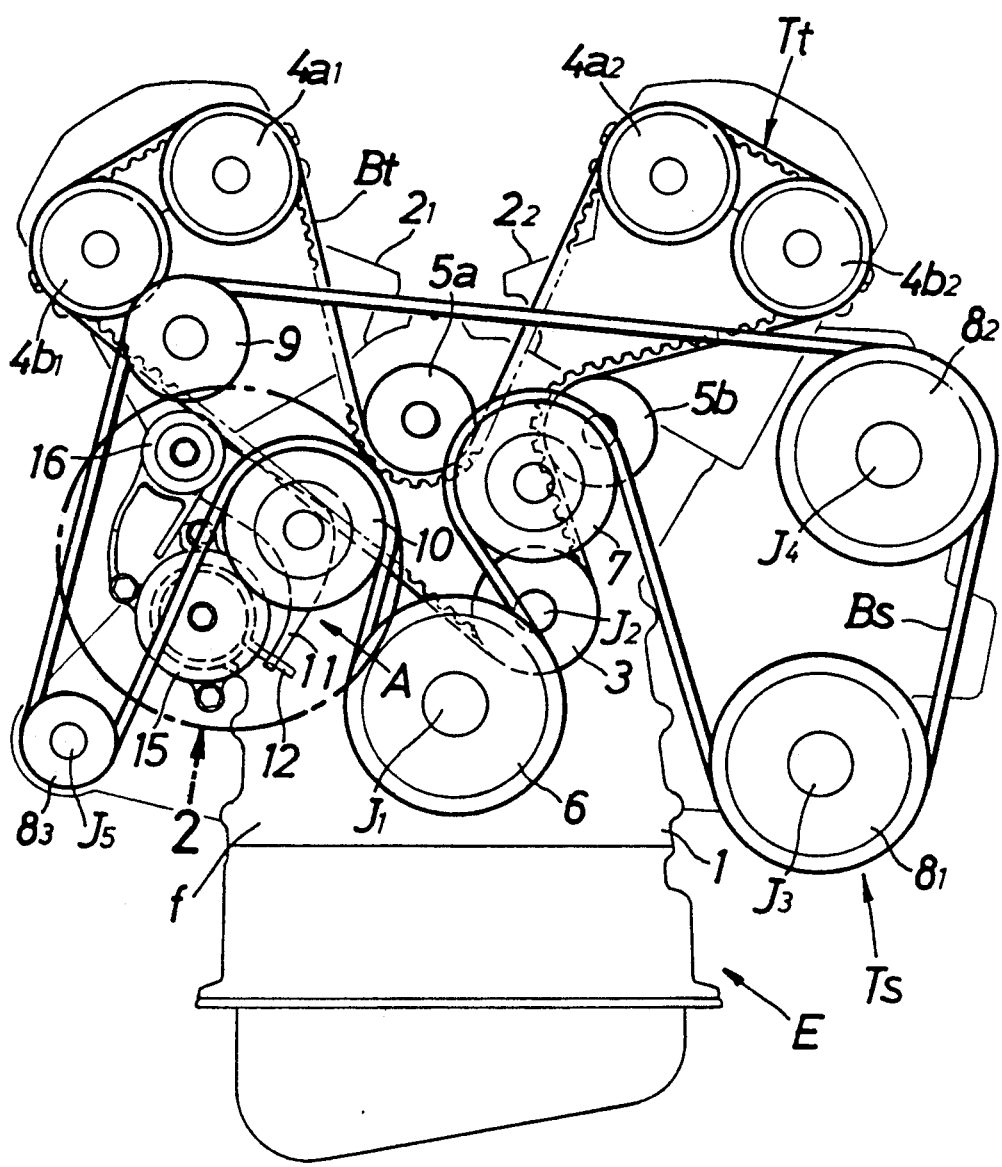
FIG. 1 is an end view of the entire engine to which the embodiment of the present invention is applied.

The present invention will now be described by way of a preferred embodiment in connection with the accompanying drawings. Referring to FIG. 1, an engine block E of a V-shaped multi-cylinder internal combustion engine is constructed such that a pair of cylinder sets $2_1$ and $2_2$ are developed into a V-shape about a crankshaft $J_1$ at an upper portion of a crank case 1. A first transmission mechanism Tt for driving valve-operating mechanisms and a second transmission mechanism Ts for driving auxiliary devices are disposed in an offset relation to each other in the direction of the axis of the crankshaft $J_1$ at one end of the crankshaft $J_1$ and engine block E. The second transmission mechanism Ts forms a wrapping connector type transmission mechanism incorporating the embodiment of the present invention.

A timing transmission belt Bt used in the first transmission mechanism Tt comprises a so-called toothed belt having a large number of teeth provided on a transmission surface of the belt Bt and wrapped, as shown in FIG. 1, around a toothed driving pulley 3 connected to a driving shaft $J_2$ rotated in operative association with the crankshaft $J_1$, toothed cam pulleys $4a_1$, $4b_1$; $4a_2$, $4b_2$ connected to valve-operating cam shafts for intake and exhaust valve operations of the cylinder sets $2_1$ and $2_2$, respectively, and a pair of tensioners $5a$ and $5b$ pivotally carried at an upper portion of one end of the crank case 1.

An auxiliary-device-driving transmission belt Bs, used in the second transmission mechanism Ts, comprises a grooved belt having a plurality of longitudinally extending grooves of an angle-shaped cross-section on a transmission surface of the belt Bs, and is wrapped, as shown in FIG. 1, around a crank pulley 6 connected to the crankshaft $J_1$, a tensioner pulley 7 pivotally carried at the support portion of one end of the crank case 1, first, second and third auxiliary pulleys $8_1$, $8_2$ and $8_3$ connected to input shafts $J_3$, $J_4$ and $J_5$ of the air-conditioning compressor, a power-steering oil pump and a generator as auxiliary devices, respectively, an idler 9 pivotally carried on one side of one of the cylinders $2_1$, and an automatic tensioner apparatus A disposed on one end of the crank case 1.

The structure of the automatic tensioner apparatus A will be described with reference to FIGS. 2 to 5. The automatic tensioner apparatus A comprises an idler pulley 10 abutting against a back surface of the auxiliary device driving belt Bs, an arm 11 swingably supporting the pulley 10, and a helical torsion coil spring 12 as a resilient member for resiliently biasing the arm 11 and idler pulley 10 in a direction to engage the auxiliary device driving belt Bs. The helical torsion coil spring 12 is accommodated in a casing 15. The casing 15 is comprised of a bottomed cylindrical case body 13 joined to one side surface f of the engine block as a supporting surface by a plurality of bolts $B_1$, and a lid plate 14 secured to the body 13 by a bolt $B_2$ to close the open end of the case body 13. The spring 12 has one end $12b$ fixed to the bottom of the case body 13 and the other end $12a$ projecting outwardly from a restricted opening $13a$ formed in a peripheral wall of the case body 13.

The case body 13 has an arm pivot-supporting portion 16 which is integrally provided on one side thereof with an intermediate arm 17 interposed therebetween, such that the arm pivot-supporting portion 16 is offset relative to the helical torsion coil spring 12 in a direction along the one end surface f of the engine block as the supporting surface and relative to the spring 12 in a direction away from the surface f. A base portion $11a$ of the arm 11 is swingably supported on the pivot-supporting portion 16 through a bearing 18. The bearing 18 has an outer race $18o$ press-fitted into a mounting hole $16a$ in the pivotally supporting portion 16, and an inner race $18i$ fitted over a boss projectingly provided on the base portion $11a$ of the arm 11 and secured by a bolt $B_3$ and a washer 19.

Figure 2:
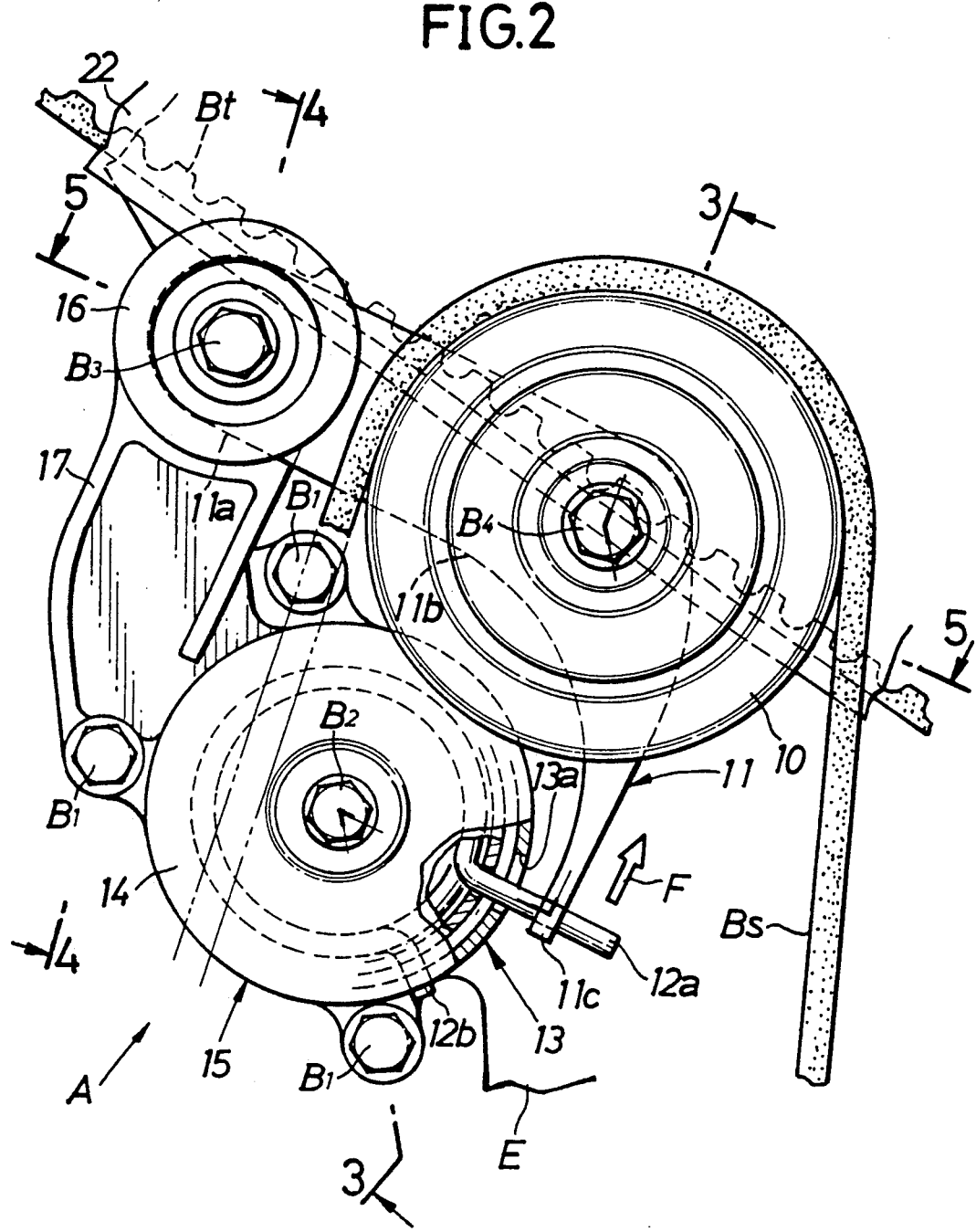
FIG. 2 is an enlarged view of the portion in the circle identified by an arrow 2 in FIG. 1.
Figure 3:
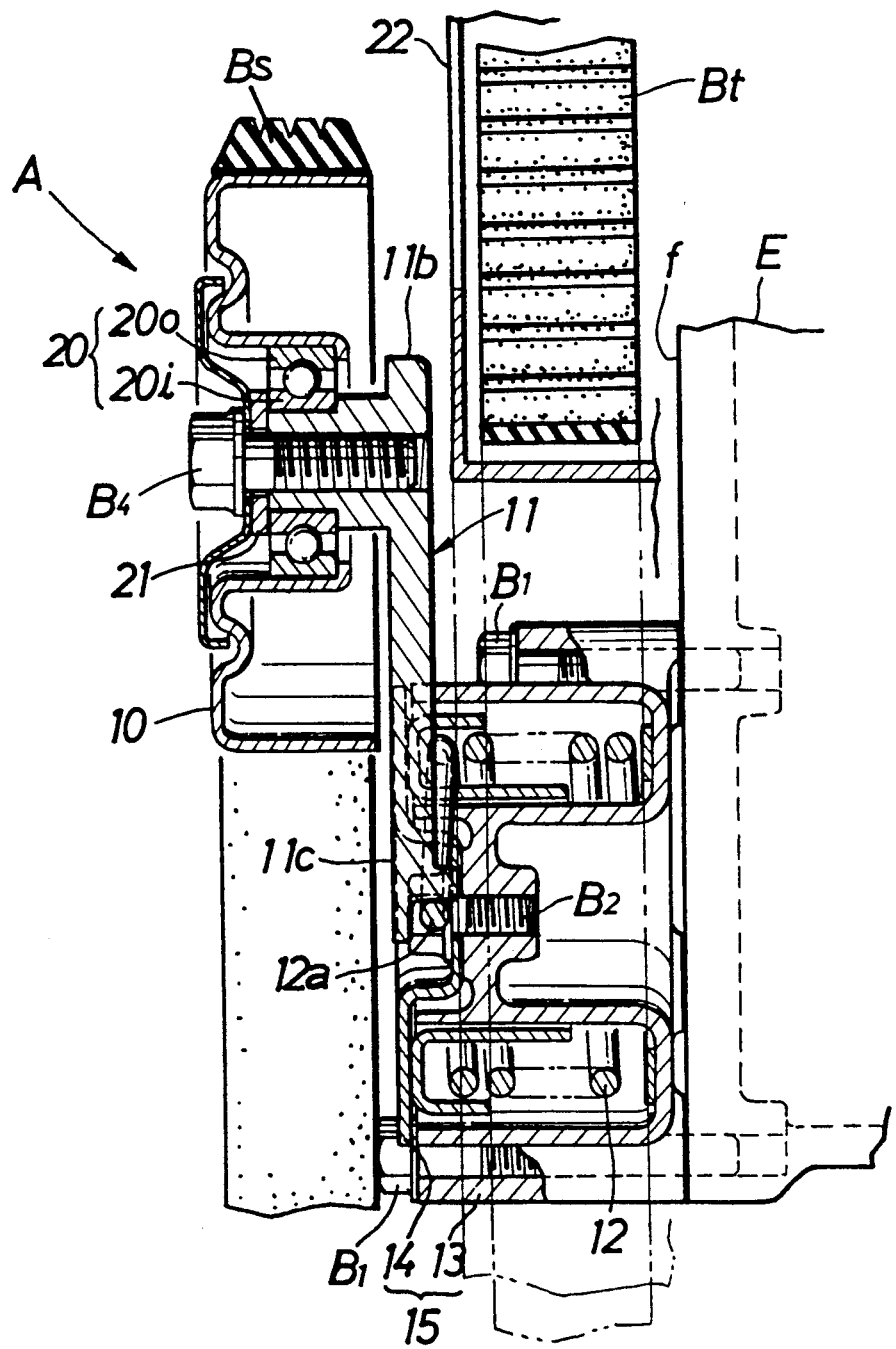
FIG. 3 is a sectional view taken along a line 3—3 in FIG. 2.
Figure 4:
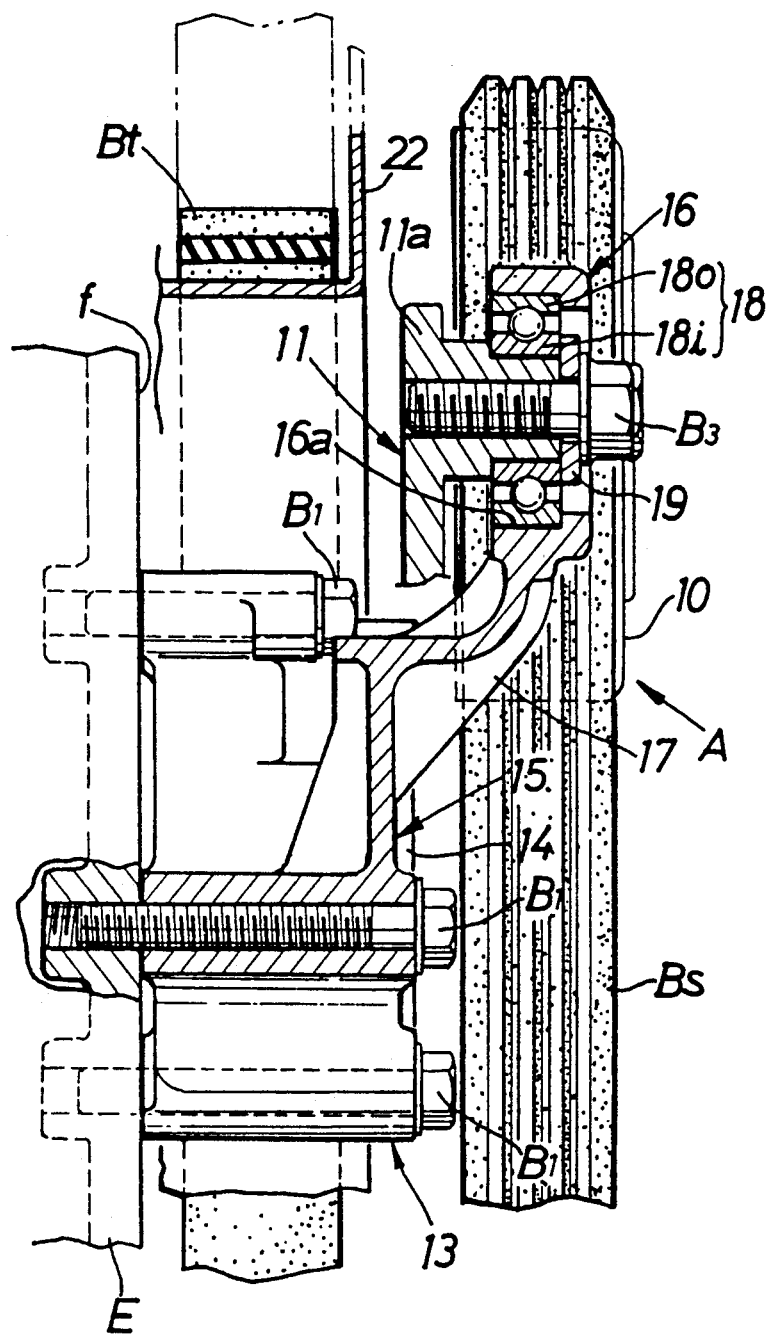
FIG. 4 is a sectional view taken along a line 4—4 in FIG. 2.
Figure 5:
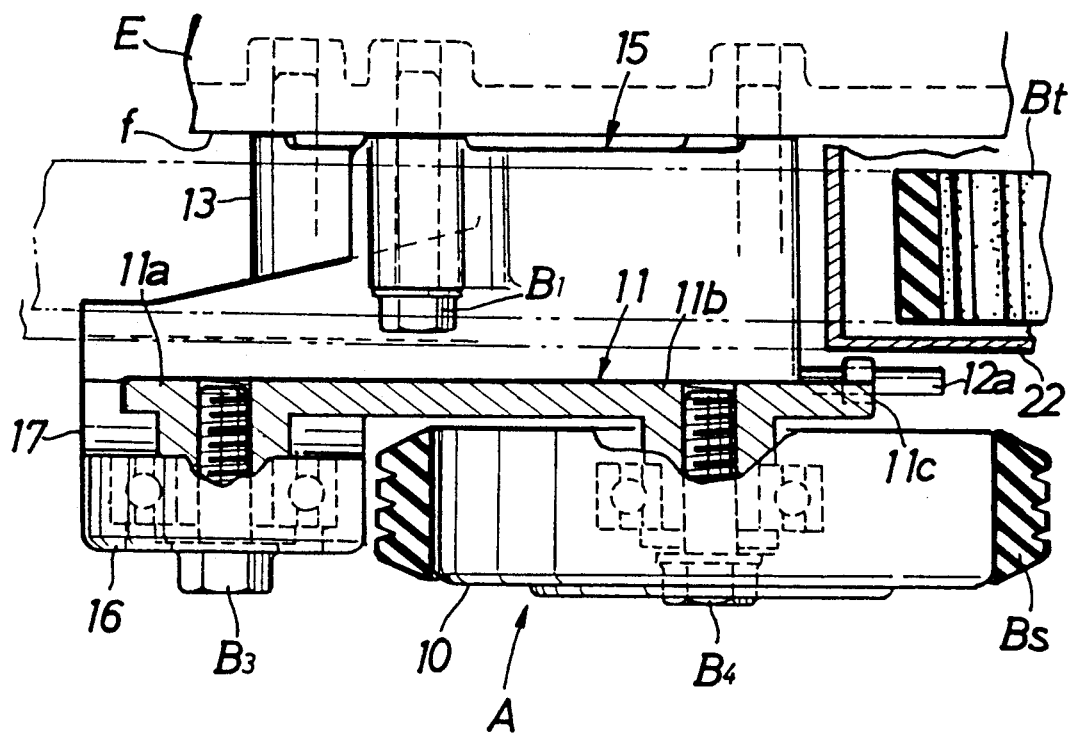
FIG. 5 is a sectional view taken along a line 5—5 in FIG. 2.

The arm 11 is formed into an inverted L-shape as shown in FIG. 2, and the idler pulley 10 is rotatably carried at an intermediate portion $11b$ of the arm 11 through a bearing 20. The bearing 20 has an outer race $20o$ press-fitted into an inner peripheral wall of the idler pulley 10, and an inner race $20i$ fitted over a boss projecting from the intermediate portion $11b$ of the arm 11 and secured by a bolt $B_4$ and a washer 21.

A tip end $11c$ of the arm 11 is bifurcated to engage a movable end $12a$ of the helical torsion coil spring 12. This ensures that the arm 11 is subjected to a resilient force F (see FIG. 2) in an upward direction with a resistance to a torsional deformation by the spring 12, i.e., in a direction to bring the idler pulley 10 into engagement with the auxiliary device driving belt Bs. The arm 11 is permitted to swing within a range in which the movable end $12a$ can be moved within the restricting opening $13a$.

The timing transmission belt Bt is wound to pass in proximity to the end surface f of the engine block E to pass through a space between the surface f and the intermediate portion $11b$ of the arm 11, particularly in the vicinity of the center of rotation of the driving pulley 10 and to pass through a space between the base portion $11a$ of the arm 11 and the surface f in the vicinity of a center of swinging movement of the arm 11. At least a portion of the timing transmission belt Bt is covered with a cover plate 22 detachably secured to the engine block E.

The operation of the above-described embodiment will now be described. When the engine is operated, a driving force is transmitted through the driving pulley 3, rotated in operative association with the crankshaft $J_1$, to the timing transmission belt Bt to rotatively drive the valve operating cam shafts for intake and exhaust valve operations of the cylinder sets $2_1$ and $2_2$. The driving force is also transmitted through the crank pulley 6, which is rotated in operative association with the crankshaft $J_1$, to the auxiliary device driving belt Bs to rotatively drive the individual auxiliary devices. During this time, a moderate tensioning force is applied to a tension side of the auxiliary device driving belt Bs by the automatic tensioner apparatus A.

Figure 6:
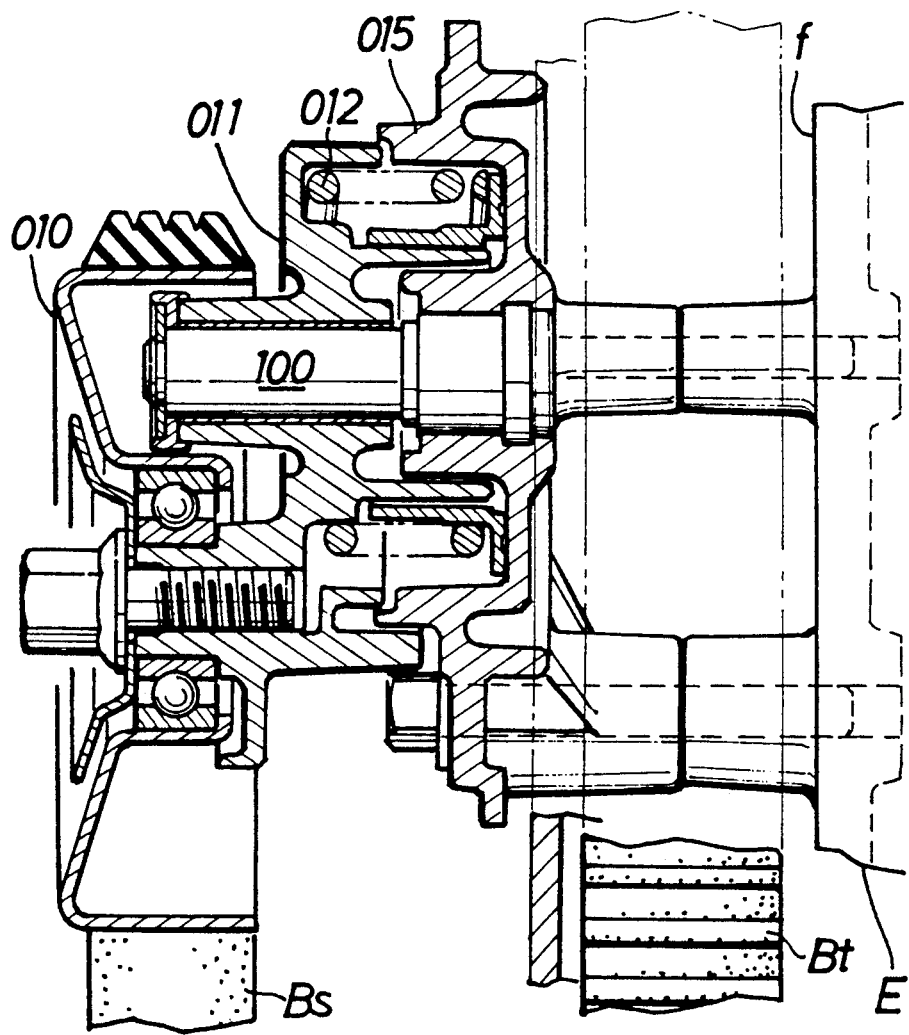
FIG. 6 is a longitudinal sectional view similar to FIG. 3 of an essential portion of the prior art automatic tensioner apparatus.

The arm pivot-supporting portion 16 is provided and extended from the casing 15 in such a manner as to be offset in a direction away from one end surface f of the engine block, the engine block serving as the supporting surface, and in a direction away from the surface f relative to the helical torsion coil spring 12. Hence, notwithstanding that the timing transmission belt Bt passes through the vicinity of the center of swinging movement of the arm 11, the arm pivot-supporting portion 16 can be disposed at a place extremely far from the one end surface f with respect to the transmission belt Bt, and any interference among the pivot-supporting portion 16, the base portion $11a$ of the arm 11, and the timing transmission belt Bt can be avoided without any difficulty. Because such interference is avoided in this manner, a reduction in size of the engine can be provided, as compared with an automatic tensioner apparatus in which the belt line of the auxiliary device driving belt Bs is specifically extended forwardly as in the prior art structure shown in FIG. 6.

The arm 11 is formed relatively long in the illustrated embodiment, but the arm pivot-supporting portion 16 is diametrically separated from the helical torsion coil spring 12, so that a point of application of the spring with respect to the arm 11 (the tip end of the arm 11 in the illustrated embodiment) is disposed extremely far from the arm pivot-supporting portion 16, and, therefore, the biasing force F provided to the idler pulley 10 through the arm 11 by the spring 12 is not reduced, because of the lower lever relationship.

What is claimed is:

1. An automatic tensioner apparatus comprising an idler pulley engaging a transmission belt of a first wrapping connector type transmission mechanism, an arm for swingably supporting the idler pulley with respect to a predetermined supporting surface, and a resilient member for exerting a resilient force for swinging the arm and the idler pulley in a direction to engage the transmission belt in order to apply a predetermined tension to said transmission belt, wherein said apparatus further includes a casing secured to said supporting surface for accommodating said resilient member, and an arm pivot-supporting portion for swingably supporting a base portion of said arm, said arm pivot-supporting portion being integrally provided on the casing in such a manner that the arm pivot-supporting portion is offset relative to said resilient member in a direction along said supporting surface and relative to said resilient member in a direction away from said supporting surface.

2. An automatic tensioner apparatus according to claim 1, wherein said idler pulley is rotatably supported at an intermediate portion of said arm, and a point of application of said resilient member is located near a tip end of the arm.

3. An automatic tensioner apparatus according to claim 1, wherein said resilient member is a helical torsion coil spring.

4. An automatic tensioner apparatus according to claim 1, wherein said resilient member is disposed between said supporting surface and a plane parallel to said supporting surface, and said idler pulley is swung on said plane.

5. An automatic tensioner apparatus according to claim 1, 2, 3 or 4, wherein said casing is provided with an intermediate arm extending therefrom, said intermediate arm being curved so as to be separated from said supporting surface at said arm pivot-supporting portion, said intermediate arm being connected at said arm pivot-supporting portion to the base portion of said arm supporting the idler pulley, and said arm supporting the idler pulley extending substantially parallel to said supporting surface.

6. An automatic tensioner apparatus according to claim 1, 2, 3 or 4, wherein said supporting surface is one end surface of an engine block, and wherein a second wrapping connector type transmission mechanism is disposed with a portion thereof between said arm pivot-supporting portion and said one end surface.

7. An automatic tensioner apparatus according to claim 6, wherein said first wrapping connector type transmission mechanism is operatively associated with a crankshaft of an internal combustion engine to drive auxiliary devices of the engine, and said second wrapping connector type transmission mechanism is operatively associated with said crankshaft to drive a valve-operating mechanism of the engine.

8. An automatic tensioner apparatus according to claim 7, wherein said internal combustion engine is constructed such that a pair of cylinder sets are developed into a V-shape about the crankshaft at an upper portion of a crank case.

9. An automatic tensioner apparatus according to claim 6, wherein said first wrapping connector type transmission mechanism includes a single transmission belt wrapped around pulleys on input shafts of a plurality of auxiliary devices, and said second wrapping connector type transmission mechanism includes a second single transmission belt wrapped around a plurality of valve-operating cam shafts.

10. An automatic tensioner apparatus according to claim 1, wherein the arm is substantially L-shaped with a base portion, a curved intermediate portion, and a tip end, and wherein the idler pulley is rotatably supported on the arm at the intermediate portion, the arm is swingably supported at the base portion, and the resilient member exerts the resilient force at the tip end.

11. An automatic tensioner apparatus according to claim 10, wherein the resilient member is located closer to the supporting surface than the intermediate portion of the arm.

12. An automatic tensioner apparatus according to claim 1, wherein said arm pivot-supporting portion, said arm, and said idler pulley are each distanced from the supporting surface in a direction parallel to an axis of rotation of a driving pulley to provide a space between the supporting surface and said arm pivot-supporting portion, said arm, and said idler pulley, and wherein a belt of a second wrapping connector type transmission mechanism is provided to pass through said space.

13. An automatic tensioner apparatus for a transmission belt on an engine having an idler pulley engaging the transmission belt of a wrapping connector type transmission mechanism, an arm swingably supporting the idler pulley with respect to a predetermined supporting surface on the engine, and a resilient member for exerting a resilient force for swinging the arm and idler pulley in a direction to engage the transmission belt in order to apply a predetermined tension to said transmission belt, an improvement comprising, a casing secured to said supporting surface for accommodating said resilient member, and an arm pivot-supporting portion for swingably supporting a base portion of said arm, said arm pivot-supporting portion being integrally provided on the casing in such a manner that the arm pivot-supporting portion is offset relative to said resilient member in a direction along said supporting surface and relative to said resilient member in a direction away from said supporting surface.

14. An automatic tensioner apparatus according to claim 13, wherein said arm pivot-supporting portion, said arm, and said idler pulley are distanced from the supporting surface in a direction parallel to an axis of rotation of a driving pulley to provide a space between the supporting surface and said arm pivot-supporting portion, said arm, and said idler pulley, and wherein a belt of a second wrapping connector type transmission mechanism is provided to pass through said space.

15. An automatic tensioner apparatus for an idler pulley engaging a transmission belt of a wrapping connector type transmission mechanism, comprising, an arm for swingably supporting the idler pulley with respect to a predetermined supporting surface, a resilient member for exerting a resilient force for swinging the arm and idler pulley in a direction to engage the transmission belt in order to apply a predetermined tension to said transmission belt, a casing secured to said supporting surface for accommodating said resilient member, said arm having a base portion offset relative to said resilient member in a direction along said supporting surface and relative to said resilient member in a direction away from said supporting surface.

16. An automatic tensioner apparatus according to claim 15, wherein said arm, its base portion, and said idler pulley are distanced from the supporting surface in a direction parallel to an axis of rotation of a driving pulley to provide a space between the supporting surface and said arm, its base portion, and said idler pulley, and wherein a belt of a second wrapping connector type transmission mechanism is provided to pass through said space.

* * * * *